(12) United States Patent
Kumura

(10) Patent No.: US 10,269,487 B2
(45) Date of Patent: Apr. 23, 2019

(54) ANTENNA DEVICE AND ELECTRONIC APPARATUS

(71) Applicant: Dexerials Corporation, Shinagawa-ku, Tokyo (JP)

(72) Inventor: Tatsuo Kumura, Tokyo (JP)

(73) Assignee: Dexerials Corporation, Shinagawa-ku, Tokyo (JP)

( * ) Notice: Subject to any disclaimer, the term of this patent is extended or adjusted under 35 U.S.C. 154(b) by 116 days.

(21) Appl. No.: 15/533,772

(22) PCT Filed: Dec. 8, 2015

(86) PCT No.: PCT/JP2015/006107
§ 371 (c)(1),
(2) Date: Jun. 7, 2017

(87) PCT Pub. No.: WO2016/092826
PCT Pub. Date: Jun. 16, 2016

(65) Prior Publication Data
US 2017/0330683 A1    Nov. 16, 2017

(30) Foreign Application Priority Data

Dec. 9, 2014    (JP) ................................ 2014-249143

(51) Int. Cl.
*H02J 50/10*        (2016.01)
*H01F 38/14*        (2006.01)
(Continued)

(52) U.S. Cl.
CPC ............... *H01F 38/14* (2013.01); *H01Q 7/06* (2013.01); *H02J 7/0027* (2013.01);
(Continued)

(58) Field of Classification Search
CPC ......... H01F 38/14; H01F 27/365; H01Q 7/06; H02J 7/0027; H02J 7/0042; H02J 7/025; H02J 50/10; H04B 5/0037
(Continued)

(56) References Cited

FOREIGN PATENT DOCUMENTS

| JP | 2002184633 A | 6/2002 |
|----|--------------|--------|
| JP | 2005094561 A | 4/2005 |

(Continued)

OTHER PUBLICATIONS

Jun. 13, 2017, International Preliminary Report on Patentability issued in the International Patent Application No. PCT/JP2015/006107.

(Continued)

*Primary Examiner* — Hal Kaplan
(74) *Attorney, Agent, or Firm* — Kenja IP Law PC

(57) ABSTRACT

Provided is a contactless power supply antenna device that has raised power transmission efficiency while also enabling size-reduction for mounting on a wearable terminal or the like. The antenna device includes a power transmission antenna (2) and a power reception antenna (3). The power transmission antenna (2) includes: a magnetic core including two magnetic plates (21) that face each other, a magnetic material-containing connecting portion (22) that connects at least part of an end section of each of the two magnetic plates (21), and a space (23) between the two magnetic plates (21); and a power transmission coil (25) disposed on at least one of the two magnetic plates (21) at a side thereof that faces the space (23). The power reception antenna (3) includes a power reception coil (31) and is positionable in the space (23).

18 Claims, 17 Drawing Sheets

(51) Int. Cl.
  *H01F 27/36* (2006.01)
  *H04B 5/00* (2006.01)
  *H01Q 7/06* (2006.01)
  *H02J 7/00* (2006.01)
  *H02J 7/02* (2016.01)

(52) U.S. Cl.
  CPC ............ *H02J 7/0042* (2013.01); *H02J 7/025* (2013.01); *H04B 5/0037* (2013.01); *H01F 27/365* (2013.01); *H02J 50/10* (2016.02)

(58) Field of Classification Search
  USPC ........................................................ 307/104
  See application file for complete search history.

(56) References Cited

FOREIGN PATENT DOCUMENTS

| | | | |
|---|---|---|---|
| JP | 2005269857 A | 9/2005 | |
| JP | 2010115363 A | 5/2010 | |
| JP | 2014204550 A | 10/2014 | |

OTHER PUBLICATIONS

Feb. 9, 2016, International Search Report issued in the International Patent Application No. PCT/JP2015/006107.

Dec. 27, 2018, Office Action issued by the State Intellectual Property Office in the corresponding Chinese Patent Application No. 201580063367.0.

ANTENNA DEVICE AND ELECTRONIC APPARATUS

CROSS-REFERENCE TO RELATED APPLICATION

This application claims priority of Japanese Patent Application No. 2014-249143 (filed on Dec. 9, 2014), the entirety of which is incorporated into this application by reference.

TECHNICAL FIELD

This application relates to an antenna device and electronic apparatus that include a power transmission antenna and a power reception antenna, and are used for contactless power supply through electromagnetic induction.

BACKGROUND

Conventional antenna devices for use in contactless power supply through electromagnetic induction include a wide variety of antenna devices for power transmission such as those according to the Qi standard. Putting aside applications that require compatibility, such antenna devices are typically used as a pairing of an antenna device for power transmission and an antenna device for power reception that have roughly the same shape in consideration of magnetic coupling and productivity.

Recently, there has been a trend of mounting contactless power supply antennas on wearable terminals. In such a situation, there is a limitation on the mounted contactless power supply antenna in terms of the small volume allotted thereto because the size of the wearable terminal itself is also small. Accordingly, it is necessary to raise power transmission efficiency in contactless power supply within the bounds of this limitation.

Examples of combinations of an antenna device for power transmission and an antenna device for power reception that have been considered with the aim of raising power supply efficiency include configurations described in PTL 1 and 2. In these configurations, the antenna device for power transmission is a feed line and the antenna device for power reception is a coil that is wound around a core having a shape that surrounds the feed line.

CITATION LIST

Patent Literature

PTL 1: JP 2005-269857 A
PTL 2: JP 2002-184633 A

SUMMARY

Technical Problem

However, in the case of a contactless power supply antenna device configuration that combines an antenna device for power transmission and an antenna device for power reception such as described in PTL 1 and 2, it is difficult to reduce the overall size of the contactless power supply antenna device. In particular, it is not possible the satisfy the limitation on volume allotted to a contactless power supply antenna device when the contactless power supply antenna device is to be mounted on a wearable terminal or the like.

In light of the problems set forth above, an objective of the present disclosure is to provide a contactless power supply antenna device having raised power transmission efficiency.

Solution to Problem

In order to solve the problems set forth above, an antenna device according to the present disclosure comprises:
a power transmission antenna including
a magnetic core including two magnetic plates that face each other, a magnetic material-containing connecting portion that connects at least part of an end section of each of the two magnetic plates, and a space between the two magnetic plates, and
a power transmission coil disposed on at least one of the two magnetic plates at a side thereof that faces the space; and
a power reception antenna including a power reception coil, wherein the power reception antenna is positionable in the space.

Moreover, an electronic apparatus according to the present disclosure comprises:
a power transmission-side electronic apparatus including a power transmission antenna that includes
a magnetic core including two magnetic plates that face each other, a magnetic material-containing connecting portion that connects at least part of an end section of each of the two magnetic plates, and a space between the two magnetic plates, and
a power transmission coil disposed on at least one of the two magnetic plates at a side thereof that faces the space; and
a power reception-side electronic apparatus including a power reception antenna that includes a power reception coil, wherein
the power transmission-side electronic apparatus and the power reception-side electronic apparatus are positionable in combination such that the power reception antenna is positioned in the space.

Advantageous Effect

Through the antenna device according to the present disclosure, it is possible to provide a contactless power supply antenna device having raised power transmission efficiency.

DETAILED DESCRIPTION

The following provides a detailed description of an embodiment of the present disclosure with reference to the drawings. However, the present disclosure is not limited to just the following embodiment and various alterations may of course be made that do not deviate from the essential scope of the present disclosure.

Embodiment of Antenna Device

Figure 1A:
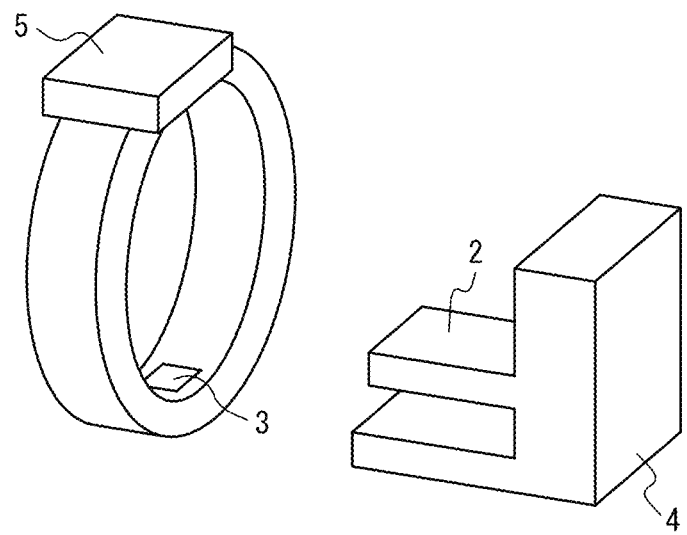
FIG. 1A is a perspective view illustrating an example in which a power transmission antenna and a power reception antenna according to a present embodiment are each incorporated into and used in an electronic apparatus, and illustrates a state in which the power transmission-side electronic apparatus and the power reception-side electronic apparatus are not positioned in combination.
Figure 1B:
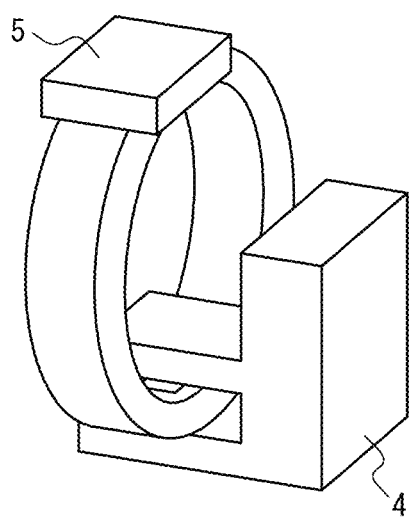
FIG. 1B is a perspective view illustrating an example in which the power transmission antenna and the power reception antenna according to the present embodiment are each incorporated into an electronic apparatus, and illustrates a state in which the power transmission-side electronic apparatus and the power reception-side electronic apparatus are positioned in combination.

An antenna device 1 according to a present embodiment includes a power transmission antenna 2 and a power reception antenna 3. FIGS. 1A and 1B are perspective views that illustrate an example in which the power transmission antenna 2 and the power reception antenna 3 of the antenna device 1 according to the present embodiment are respectively incorporated into and used in a power transmission-side electronic apparatus 4 and a power reception-side electronic apparatus 5. FIG. 1A illustrates a state in which the power transmission-side electronic apparatus 4 and the power reception-side electronic apparatus 5 are not positioned in combination. FIG. 1B illustrates a state in which the power transmission-side electronic apparatus 4 and the power reception-side electronic apparatus 5 are positioned in combination. In other words, FIG. 1B illustrates a state in which a section into which the power reception antenna 3 is incorporated is positioned in a section into which the power transmission antenna 2 is incorporated; power transmission and reception are performed in this state.

Figure 2A:
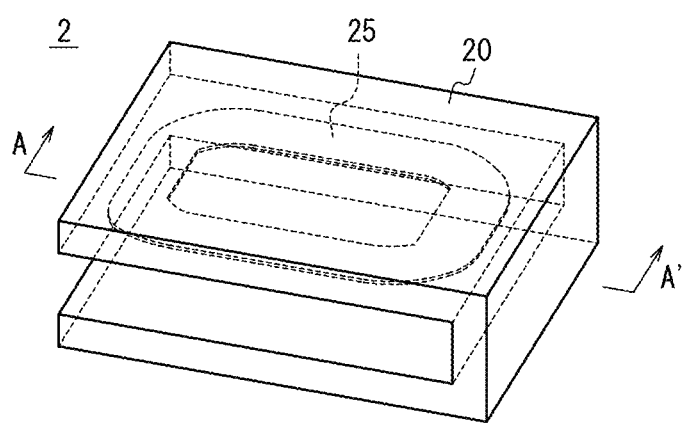
FIG. 2A is a perspective view illustrating the power transmission antenna according to the present embodiment.
Figure 2B:
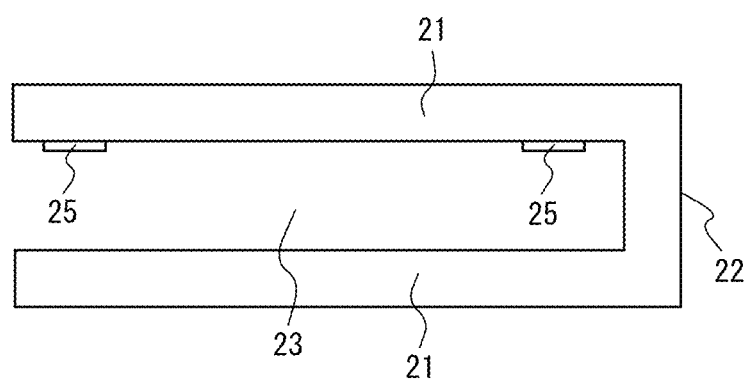
FIG. 2B is a cross-sectional view A-A' illustrating the power transmission antenna according to the present embodiment.

FIG. 2A is a perspective view and FIG. 2B is a cross-sectional view A-A' that illustrate the power transmission antenna 2 according to the present embodiment. The power transmission antenna 2 includes a magnetic core 20 and a power transmission coil 25. The magnetic core 20 includes two magnetic plates 21 that face each other across a space 23, and a magnetic material-containing connecting portion 22 that connects at least part of an end section of each of the two magnetic plates 21. The power transmission coil 25 is disposed on at least one of the two magnetic plates 21 at a side thereof that faces the space 23. The power transmission antenna 2 preferably includes a casing made of resin.

(Description of Magnetic Core)

Figure 3A:
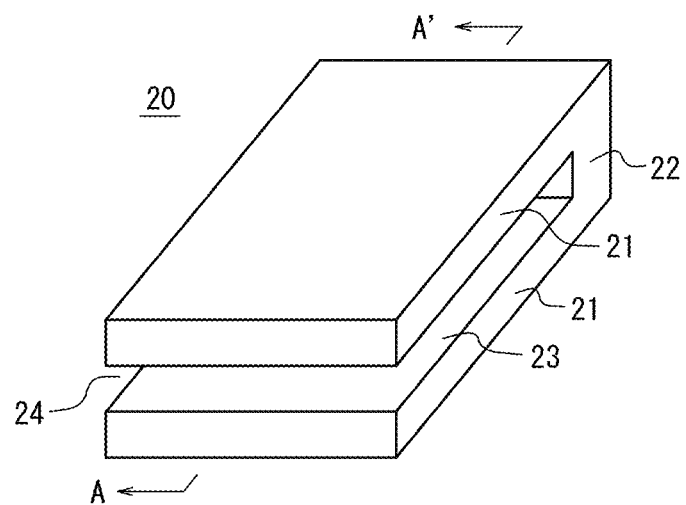
FIG. 3A is a perspective view illustrating a magnetic core according to the present embodiment.
Figure 3B:
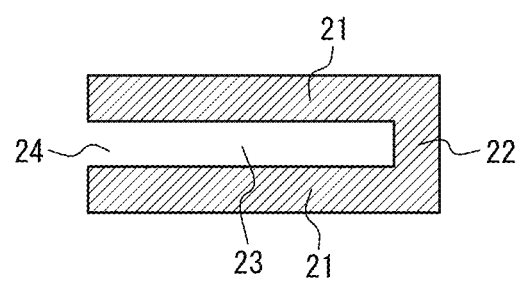
FIG. 3B is a cross-sectional view A-A' illustrating the magnetic core according to the present embodiment.

The following provides further description of the magnetic core 20 according to the present embodiment. FIG. 3A is a perspective view and FIG. 3B is a cross-sectional view A-A' that illustrate the magnetic core 20 according to the present embodiment. The magnetic core 20 includes the two magnetic plates 21 that face each other across the space 23, and the magnetic material-containing connecting portion 22 that connects at least part of an end section of each of the two magnetic plates 21. It is preferable that the two magnetic plates 21 and the connecting portion 22 of the magnetic core 20 are formed as a single structure. The two magnetic plates 21 and the connecting portion 22 of the magnetic core 20 may be formed as separate components that are subsequently joined together. The magnetic plates 21 preferably each have a flat plate-shape that is substantially rectangular. The magnetic plates 21 are not required to be substantially rectangular. Moreover, the magnetic plates 21 are not required to have a flat plate-shape. For example, the magnetic plates 21 may be a geometrical shape bordered by a curve or may be in a form composed by a curved surface.

The two magnetic plates 21 face each other across the space 23 with a substantially parallel orientation. The connecting portion 22 connects respective end sections of the two magnetic plates 21 (i.e., one edge of each of the magnetic plates 21). Note that the connecting portion 22 may partially connect just part of the one edge such as an end section of the edge or a middle section of the edge. Moreover, the connecting portion 22 is not limited to connecting just one edge and may connect two or more edges.

The power reception antenna 3 is inserted into the space 23 through a section between the two magnetic plates 21 that is not connected by the connecting portion 22. The section that is not connected by the connecting portion 22 is referred to as an opening 24.

The magnetic core 20 according to the present embodiment has a square U-shaped cross-sectional shape. In a situation in which the magnetic core 20 has a square U-shaped cross-sectional shape, a power reception antenna 3 that is attached to an end section of a component can be easily inserted into the space 23. Moreover, a power reception antenna 3 that is attached partway along a component having a long edge, such as a rod-shaped, belt-shaped, or card-shaped component, can also be easily inserted into the space 23. It is preferable that the length from an edge of one of the two magnetic plates 21 at a side at which the connecting portion 22 is located to an opposite edge relative to the edge at the side at which the connecting portion 22 is located is different to the length from an edge of the other of the magnetic plates 21 at the side at which the connecting portion 22 is located to an opposite edge relative to the edge at the side at which the connecting portion 22 is located. In other words, it is preferable that the two magnetic plates 21 differ in terms of the length from the edge at the side at which the connecting portion 22 is located to the opposite edge relative to the edge at the side at which the connecting portion 22 is located. This configuration facilitates insertion of a component to which the power reception antenna 3 is attached.

Examples of preferable materials for the magnetic core 20 according to the present embodiment include metal magnetic materials such as Fe-based metal magnetic materials, Fe—Si-based metal magnetic materials, sendust, permalloy, and amorphous metal magnetic materials; MnZn ferrite; NiZn ferrite; magnetic resin materials produced by adding a resin as a binder to magnetic particles of any of the preceding magnetic materials; and green compact materials produced by adding a small amount of a binder to magnetic particles and performing green compacting thereof. These materials are preferably selected according to material properties such as relative magnetic permeability, ease of processing, and ease of molding. It is preferable that the two magnetic plates 21 and the connecting portion 22 are made of the same material. This can reduce discontinuity of relative magnetic permeability within the magnetic core 20 and can reduce magnetic loss.

Figure 4A:
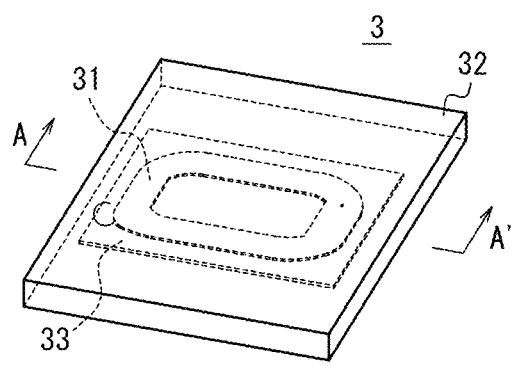
FIG. 4A is a perspective view illustrating the power reception antenna according to the present embodiment.
Figure 4B:
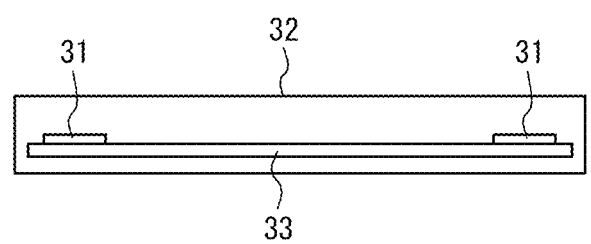
FIG. 4B is a cross-sectional view A-A' illustrating the power reception antenna according to the present embodiment.

FIGS. 4A and 4B illustrate the power reception antenna 3 according to the present embodiment. FIG. 4A is a perspective view of the power reception antenna 3 and FIG. 4B is a cross-sectional view A-A' of the same. The power reception antenna 3 includes a power reception coil 31 and a magnetic sheet 33. The power reception coil 31 is disposed on one surface of the magnetic sheet 33. The power reception antenna 3 preferably includes a casing 32 that houses the power reception coil 31 and the magnetic sheet 33. The casing 32 is preferably made of resin.

Figure 5:
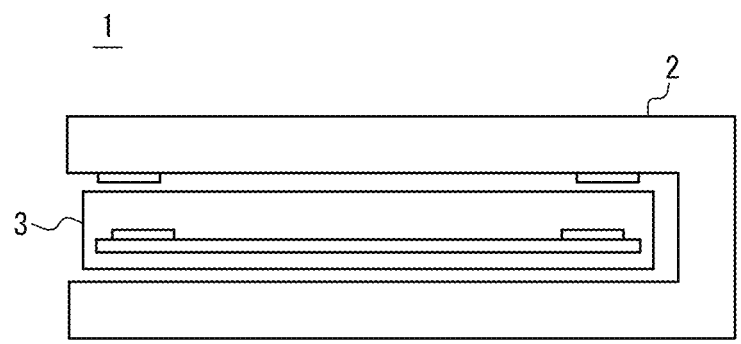
FIG. 5 is a cross-sectional view illustrating a state in which the power transmission antenna and the power reception antenna are combined by inserting the power reception antenna into a space of the power transmission antenna.

FIG. 5 is a cross-sectional view illustrating a state in which the power reception antenna 3 is inserted into the space 23 of the power transmission antenna 2 in the antenna device 1 according to the present embodiment. As illustrated in FIG. 5, the power reception antenna 3 is positionable in the space 23 of the power transmission antenna 2. Power transmission and reception are performed in a state in which the power reception antenna 3 is positioned in the space 23 of the power transmission antenna 2.

The following describes contactless power supply through electromagnetic induction, which is an application of the antenna device 1 according to the present embodiment. Electromagnetic induction is a phenomenon whereby induced electromotive force is generated in a conductor in an environment of varying magnetic flux. A configuration including one pair of coils is usually adopted as a configuration for causing the phenomenon of electromagnetic induction to occur. A current (preferably an alternating current) is caused to flow in one of the coils (primary coil) to generate magnetic flux that exhibits temporal variation and an induced electromotive force is generated in the other coil (secondary coil) through linkage of this magnetic flux. A coupling coefficient k is defined between the pair of coils. The coupling coefficient k is the ratio of the magnetic flux generated by the primary coil and the magnetic flux received in the secondary coil. The coupling coefficient k is a dimensionless number that has a value of at least 0 and no greater than 1. The coupling coefficient k approaches 1 with increasing relative magnetic permeability of a path of lines of magnetic flux passing through the primary coil and the secondary coil. For example, in a typical transformer, the primary coil and the secondary coil have a common core that is continuous and has a high relative magnetic permeability, and thus the core composes a closed loop of lines of magnetic flux. Through this configuration, a coupling coefficient k of approximately 0.98 or higher is achieved. Power transmission and reception efficiency between the primary coil and the secondary coil can be considered to rise as the coupling coefficient k approaches a value of 1.

In contrast, it is not possible for the power transmission antenna 2 and the power reception antenna 3 used in contactless power supply to have a common core that is continuous as in a transformer since the power transmission antenna 2 and the power reception antenna 3 are contactless. The following description uses the configuration of a transformer for comparison. First, the power transmission coil 25 and the power reception coil 31 respectively correspond to the primary coil and the secondary coil. Moreover, the magnetic core 20 of the power transmission antenna 2 corresponds to a core of the primary coil in the transformer and the magnetic sheet 33 of the power reception antenna 3 corresponds to a core of the secondary coil in the transformer. However, in contrast to the transformer, a space having low relative magnetic permeability is present between the cores. Accordingly, a configuration that minimizes the distance across the space in a path of a closed loop of lines of magnetic flux passing through the core of the power transmission antenna 2 and the core of the power reception antenna 3 is effective for achieving a coupling coefficient k that is as close to 1 as possible. A more specific explanation is provided for the case of the antenna device 1 according to the present embodiment.

Figure 6A:
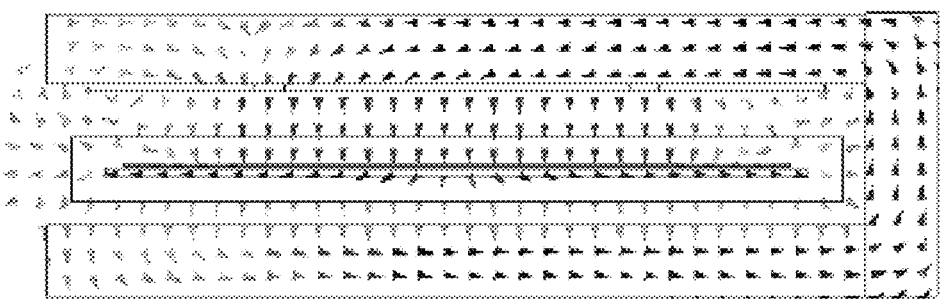
FIG. 6A is a vector representation of magnetic flux density distribution illustrating results of magnetic flux density distribution calculation for a situation in which power transmission and reception are performed using an antenna device according to the present embodiment.
Figure 6B:
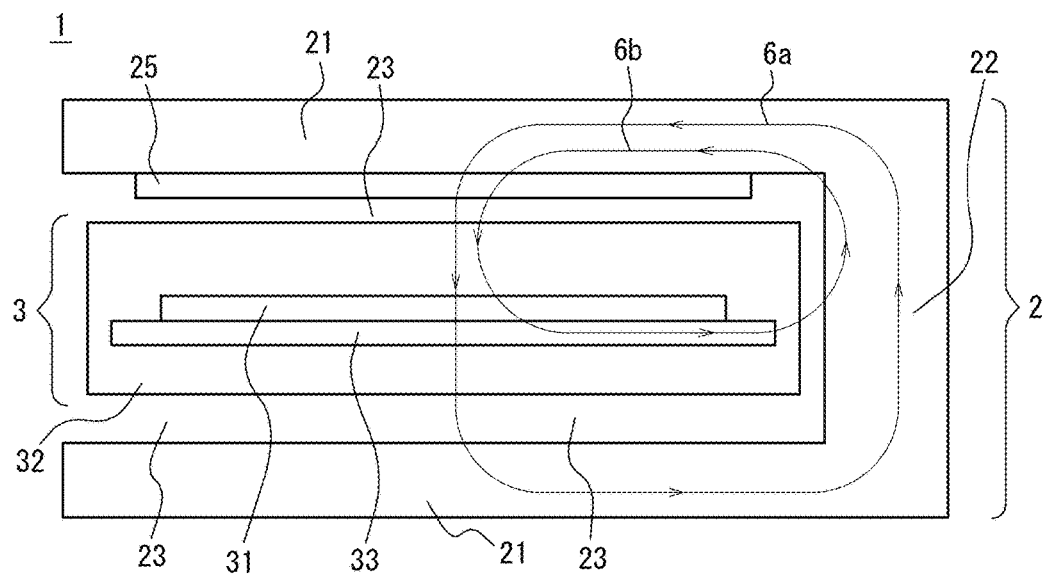
FIG. 6B illustrates results of magnetic flux density distribution calculation for a situation in which power transmission and reception are performed using the antenna device according to the present embodiment by schematically illustrating some lines of magnetic flux.

As explained above, the antenna device 1 according to the present embodiment includes the power transmission antenna 2 and the power reception antenna 3. The coupling coefficient k between the power transmission antenna 2 and the power reception antenna 3 in the configuration of the antenna device 1 according to the present embodiment was determined by using an electromagnetic field simulator to perform three-dimensional electromagnetic field analysis and calculate a magnetic flux density distribution. In the calculation conditions, the outer diameter of the power transmission coil 25 was 17 mm×21 mm, the relative magnetic permeability of the magnetic core 20 was 1,000, and the thickness of the space 23 (i.e., the interval between the two magnetic plates 21) was 4 mm. Moreover, the relative magnetic permeability of the magnetic sheet 33 of the power reception antenna 3 was 100 and the thickness of the magnetic sheet 33 was 0.2 mm. FIGS. 6A and 6B illustrate calculation results of the magnetic flux density distribution. FIG. 6A is a vector representation of the calculated magnetic flux density distribution in which higher magnetic flux density is indicated by a color closer to black. Magnetic flux generated by the power transmission coil 25 is concentrated mainly within the magnetic core 20 and exhibits almost no leakage into space externally to the magnetic core 20. This is due to the magnetic core 20 being made of a magnetic material having high relative magnetic permeability, and thus having high relative magnetic permeability and low magnetic resistance compared to space externally to the magnetic core 20. FIG. 6B schematically illustrates some of the lines of magnetic flux (i.e., flow lines of calculated magnetic flux density vectors) overlapped on FIG. 5. Lines of magnetic flux generated by the power transmission coil 25 include a line of magnetic flux 6a forming a closed loop that passes through the space 23, the power reception coil 31 included in the power reception antenna 3, one of the magnetic plates 21, the connecting portion 22, and the other of the magnetic plates 21, and then returns to the power transmission coil 25, and also includes a line of magnetic flux 6b forming a closed loop that passes through the space 23, the power reception coil 31 included in the power reception antenna 3, the magnetic sheet 33, the connecting portion 22, and one of the magnetic plates 21, and then returns to the power transmission coil 25. In the present example, the magnetic core 20 has a higher relative magnetic permeability than the magnetic sheet 33 and also has a large volume of magnetic material. Therefore, the line of magnetic flux 6a dominates and magnetic flux mainly forms a closed loop via the magnetic core 20 as a path (magnetic path).

Figure 7A:
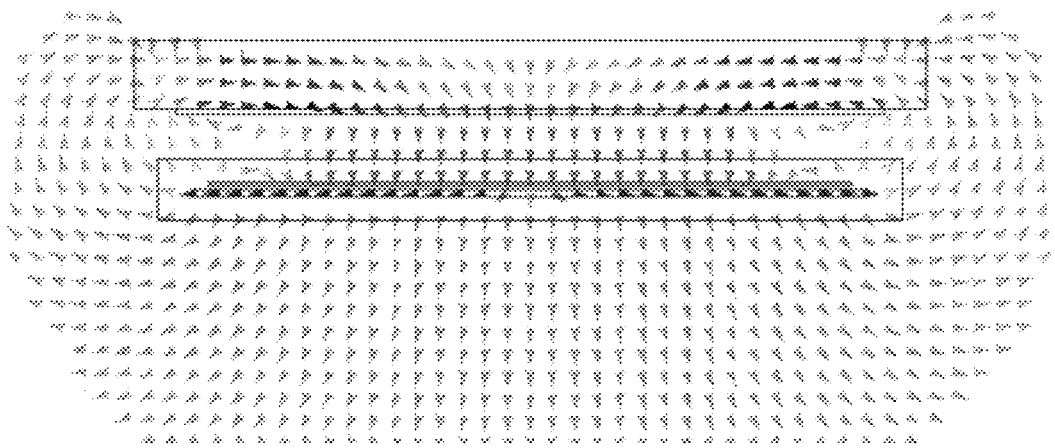
FIG. 7A is a vector representation of magnetic flux density distribution illustrating results of magnetic flux density distribution calculation for a situation in which power transmission and reception are performed using an antenna device according to a comparative example.
Figure 7B:
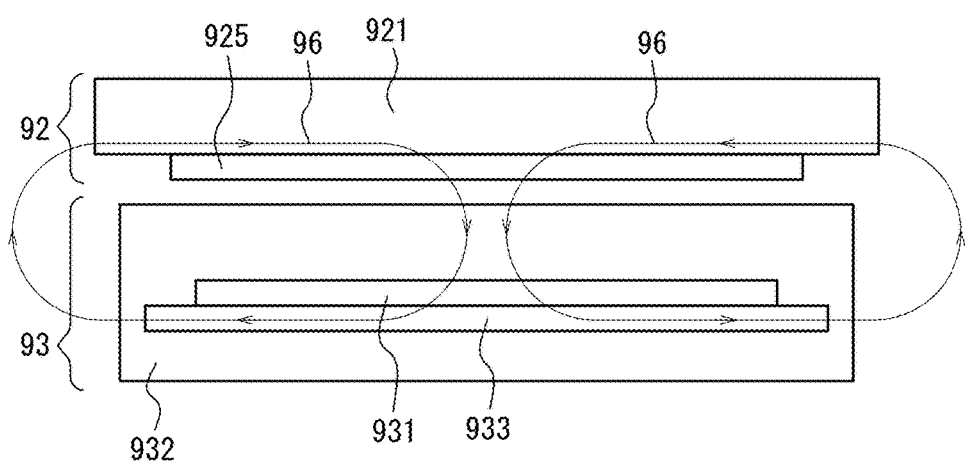
FIG. 7B illustrates results of magnetic flux density distribution calculation for a situation in which power transmission and reception are performed using the antenna device according to the comparative example by schematically illustrating some lines of magnetic flux.

For comparison, an example is provided of an antenna device 91 in which a flat plate-shaped power transmission antenna 92 and a power reception antenna 93 are combined. Calculation of a magnetic flux density distribution was carried out for the configuration of the antenna device 91 in the same way as for the antenna device 1 according to the present embodiment. The calculation conditions were the same as for the antenna device 1 with the exception that the power transmission antenna 92 had a flat plate-shape. FIG. 7A is a vector representation of the calculated magnetic flux density distribution in which higher magnetic flux density is indicated by a color closer to black. The magnetic flux density distribution range and color scale are the same as in FIG. 6A. FIG. 7B illustrates some of the lines of magnetic flux (i.e., flow lines of calculated magnetic flux density vectors) overlapped on a cross-sectional view illustrating the antenna device 91 of the comparative example. Lines of magnetic flux 96 generated by a power transmission coil 925 each form a closed loop that passes through a power reception coil 931 included in the power reception antenna 93, a magnetic sheet 933, external space, and a magnetic plate 921 of the power transmission antenna 92, and then ends at the power transmission coil 925. In this configuration, the distance that the lines of magnetic flux pass across the external space having low relative magnetic permeability is greater than the distance across the space 23 in the configuration of the antenna device 1 according to the present embodiment. Accordingly, the magnetic resistance of a path along which the lines of magnetic flux 6 pass in the configuration of the antenna device 1 according to the present embodiment is lower than the magnetic resistance of a path along which the lines of magnetic flux 96 pass in the configuration of the antenna device 91 of the comparative example.

Upon comparison of FIGS. 6A and 7A, the color representing the magnetic flux density in proximity to the power reception coil 31 or 931 is closer to black in FIG. 6A and closer to white in FIG. 7A. This demonstrates that magnetic flux density for the antenna device 1 according to the present embodiment is higher than magnetic flux density for the antenna device 91 of the comparative example. The coupling coefficients k for the antenna device 1 according to the present embodiment and the antenna device 91 of the comparative example were calculated from the calculation results of the magnetic flux density distributions for these antenna devices. The results are shown below in Table 1.

TABLE 1

|  | Comparative example | Example of present embodiment |
| --- | --- | --- |
| Coupling coefficient k | 0.716 | 0.791 |

As shown, the coupling coefficient k of the antenna device 1 according to the present embodiment is higher than the coupling coefficient k of the antenna device 91 of the comparative example. This indicates that the antenna device 1 according to the present embodiment has higher power transmission and reception efficiency than the antenna device 91 of the comparative example.

As explained above, lines of magnetic flux generated by the power transmission coil 25 in use of the power transmission antenna 2 according to the present embodiment form a closed loop that passes from the power transmission coil 25, through the space 23, the power reception antenna 3, one of the magnetic plates 21, the connecting portion 22, and the other of the magnetic plates 21, and thus the coupling coefficient k between the power transmission antenna 2 and the power reception antenna 3 is increased, and power transmission and reception efficiency is raised.

Modified Example 1 of Magnetic Core

Figure 8A:
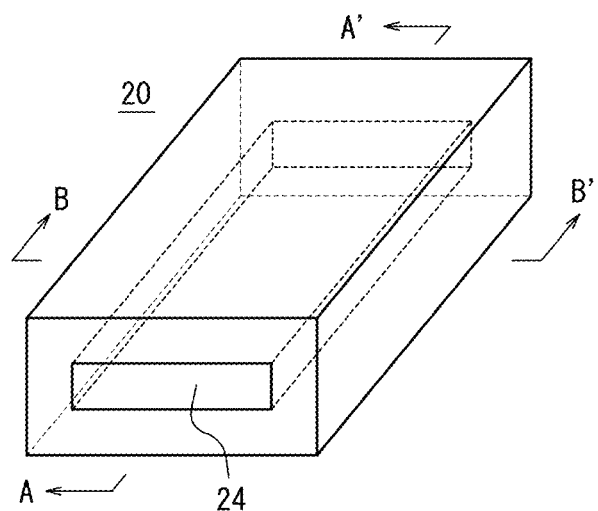
FIG. 8A is a perspective view illustrating an overview of a magnetic core according to modified example 1.
Figure 8B:
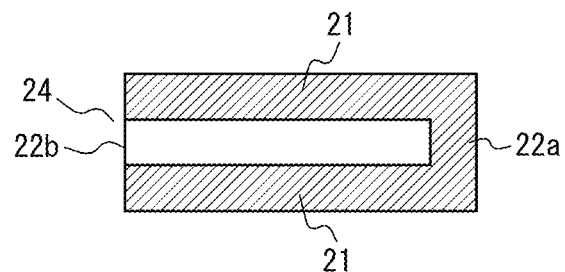
FIG. 8B is a cross-sectional view A-A' illustrating an overview of the magnetic core according to modified example 1.
Figure 8C:
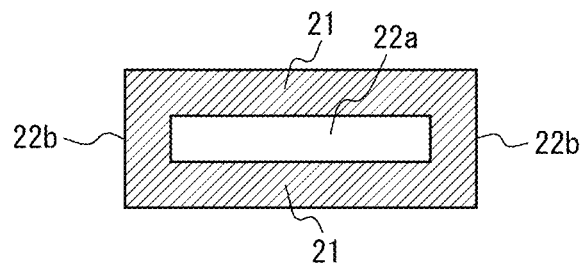
FIG. 8C is a cross-sectional view B-B' illustrating an overview of the magnetic core according to modified example 1.

FIGS. 8A, 8B, and 8C illustrate modified example 1 of the magnetic core 20. FIG. 8A is a perspective view of the magnetic core 20 of modified example 1, FIG. 8B is a cross-sectional view A-A' of the same, and FIG. 8C is a cross-sectional view B-B' of the same. The magnetic core 20 of modified example 1 differs from the magnetic core 20 according to the present embodiment in terms that connecting portions 22 connect three edges of the magnetic plates 21. In other words, the magnetic core 20 has a pocket-shape and only has an opening 24 at one location. Of the connecting portions 22 connecting the three edges of the magnetic plates 21, a connecting portion 22 that connects an opposite edge relative to an edge at which the opening 24 is located is referred to as a bottom surface connecting portion 22a and two connecting portions 22 that connect the other two edges are referred to as side surface connecting portions 22b. In the following description, the bottom surface connecting portion 22a and the side surface connecting portions 22b are referred to collectively as connecting portions 22 when it is not necessary to distinguish therebetween. The power reception antenna 3 is inserted into the space 23 of the power transmission antenna 2 including the magnetic core 20 of modified example 1 by inserting the power reception antenna 3 at an edge at which a connecting portion 22 is not present (i.e., through the opening 24 present at one location). In a situation in which the magnetic core 20 has a shape such as in modified example 1, a power reception antenna 3 that is attached to an end section of a component can be easily inserted into the space 23. Moreover, in the case of the magnetic core 20 of modified example 1, a section at which the two magnetic plates 21 are connected via the connecting portions 22 is increased compared to the magnetic core 20 according to the present embodiment, and thus the magnetic resistance of a path linking the two magnetic plates 21 is lowered. As a result, the power transmission antenna 2 has a higher coupling coefficient k with the power reception antenna 3 that is inserted in the space 23 and has higher power transmission and reception efficiency when the power transmission antenna 2 includes the magnetic core 20 of modified example 1 than when the power transmission antenna 2 includes the magnetic core 20 according to the present embodiment. Although FIGS. 8A, 8B, and 8C illustrate the appearance when three edges of the magnetic plates 21 are connected by connecting portions 22, alternatively just two adjacent edges of the magnetic plates 21 may be connected by connecting portions 22.

Modified Example 2 of Magnetic Core

Figure 9A:
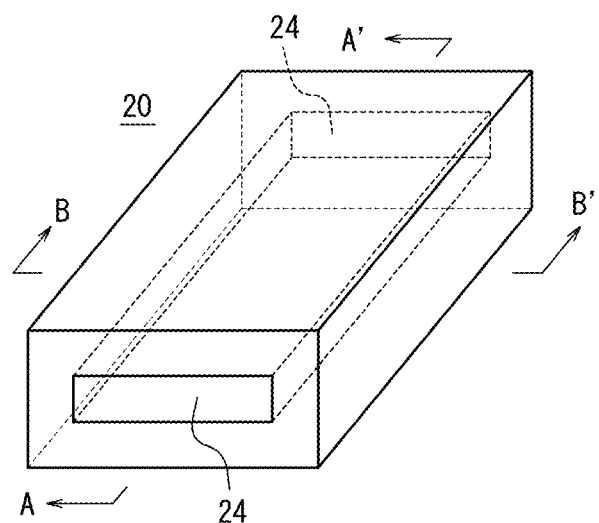
FIG. 9A is a perspective view illustrating an overview of a magnetic core according to modified example 2.
Figure 9B:
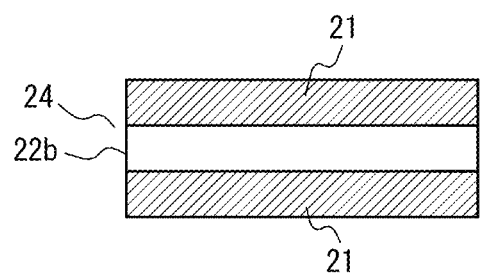
FIG. 9B is a cross-sectional view A-A' illustrating an overview of the magnetic core according to modified example 2.
Figure 9C:
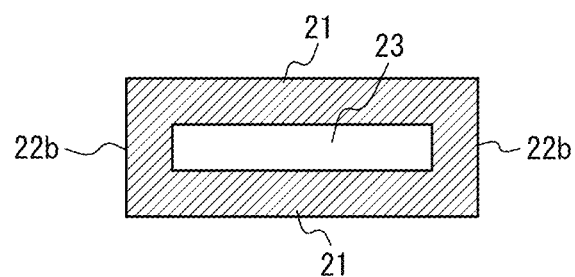
FIG. 9C is a cross-sectional view B-B' illustrating an overview of the magnetic core according to modified example 2.

FIGS. 9A, 9B, and 9C illustrate modified example 2 of the magnetic core 20. FIG. 9A is a perspective view, FIG. 9B is a cross-sectional view A-A' of the same, and FIG. 9C is a cross-sectional view B-B' of the same. The magnetic core 20 of modified example 2 differs from the magnetic core 20 according to the present embodiment in terms that connecting portions 22 connect opposite edges of the magnetic plates 21, rather than just one edge of the magnetic plates 21. Specifically, the two magnetic plates 21 having substantially rectangular flat plate-shapes face each other in a substantially parallel orientation, and the connecting portions 22 connect two opposite edges of each of the magnetic plates 21. In other words, the magnetic core 20 of modified example 2 includes side surface connecting portions 22b but does not include a bottom surface connecting portion 22a. In modified example 2, the space 23 of the magnetic core 20 is a hole that passes through the magnetic core 20 and openings 24 are present at two edges face each other. The magnetic core 20 of modified example 2 has a hollow square-shaped cross-sectional shape. The power reception antenna 3 is inserted into the space 23 of the power transmission antenna 2 including the magnetic core 20 of modified example 2 by inserting the power reception antenna 3 through the opening 24 at either of the two edges. Moreover, in the case of the magnetic core 20 of modified example 2, a section at which the two magnetic plates 21 are connected via the connecting portions 22 is increased compared to the magnetic core 20 according to the present embodiment, and thus the magnetic resistance of a path linking the two magnetic plates 21 is lowered. As a result, the power transmission antenna 2 has a higher coupling coefficient k with the power reception antenna 3 that is inserted into the space 23 and higher power transmission and reception efficiency when the power transmission antenna 2 includes the magnetic core 20 of modified example 2 than when the power transmission antenna 2 includes the magnetic core 20 according to the present embodiment. Furthermore, in the case of the power transmission antenna 2 including the magnetic core 20 of modified example 2, the power reception antenna 3 can be inserted such as to pass through the power transmission antenna 2 in a situation in which the power reception antenna 3 is attached partway along a component having a long edge such as a rod-shaped, belt-shaped, or card-shaped component.

Other Modified Examples of Magnetic Core

Figure 10A:
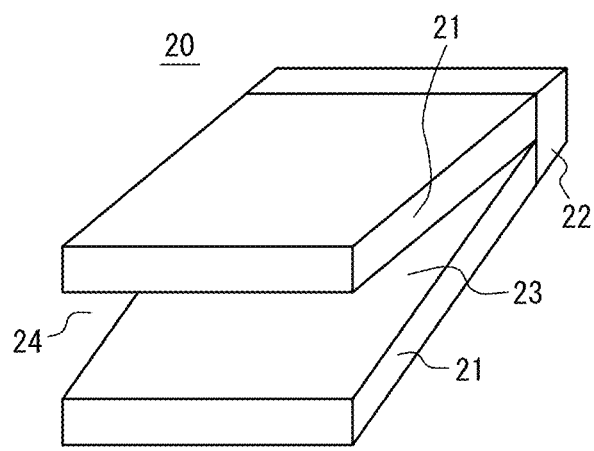
FIG. 10A illustrates a V-shaped magnetic core according to another modified example.

FIGS. 10A, 10B, 10C, and 10D illustrate other modified examples of the magnetic core 20. FIG. 10A illustrates a magnetic core 20 that has a V-shaped cross-sectional shape. Specifically, the two magnetic plates 21 having substantially rectangular flat plate-shapes face each other in a non-parallel orientation, and the connecting portion 22 connects one edge of each of the magnetic plates 21 at a side at which the distance between the magnetic plates 21 is smallest. In other words, the distance between the two magnetic plates 21 at an opposite edge relative to an edge at a side at which the connecting portion 22 is located is larger than the distance between the two magnetic plates 21 at the edge at the side at which the connecting portion 22 is located. Therefore, the power transmission antenna 2 including the magnetic core 20 illustrated in FIG. 10A facilitates insertion of the power reception antenna 3 into the space 23 because there is a large distance between the two magnetic plates 21 at the opening 24.

Figure 10B:
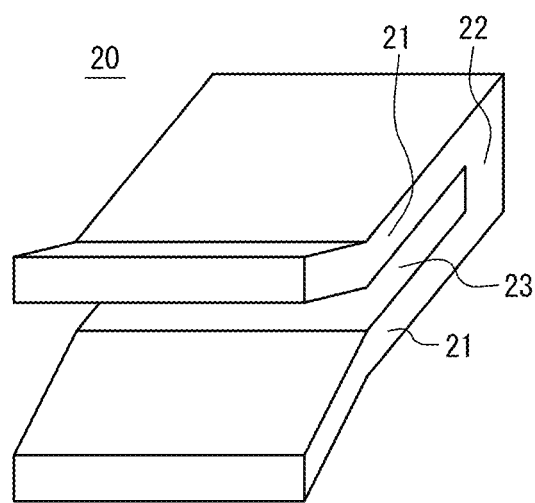
FIG. 10B illustrates a Y-shaped magnetic core according to another modified example.

FIG. 10B illustrates a magnetic core 20 that has a Y-shaped cross-sectional shape. Specifically, the two magnetic plates 21 of the magnetic core 20 according to the present embodiment extend from the opposite edge relative to the edge at the side at which the connecting portion 22 is located such that the distance between the two magnetic plates 21 increases in an opposite direction to the connecting portion 22. It is preferable that at least one of the magnetic plates 21 extends at an angle. Moreover, it is preferable that at least one of the magnetic plates 21 extends as a curved surface having a curvature such as to widen outward. This facilitates insertion of the power reception antenna 3 into the space 23 because there is a large distance between the two magnetic plates 21 at the opening 24. Furthermore, compared to the magnetic core 20 in FIG. 10A, there is a small distance between the two magnetic plates 21 in a section at which the inserted power reception antenna 3 is positioned. As a result, the coupling coefficient k of the power transmission antenna 2 and the power reception antenna 3 is increased, and power transmission and reception efficiency is raised.

Figure 10C:
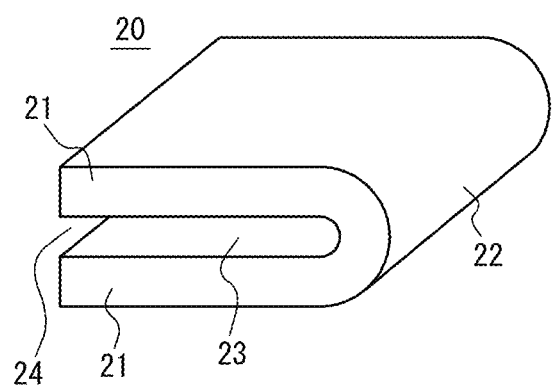
FIG. 10C illustrates a U-shaped magnetic core according to another modified example.
Figure 10D:
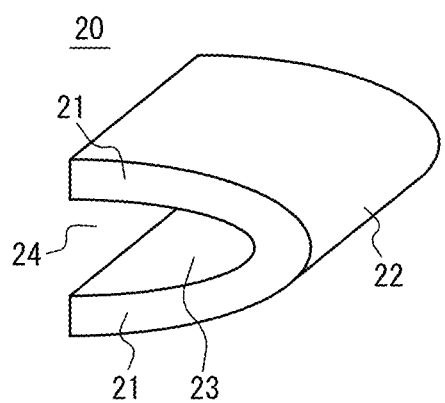
FIG. 10D illustrates a semi-elliptical magnetic core according to another modified example.

FIG. 10C illustrates a magnetic core 20 that has a U-shaped cross-sectional shape. Specifically, compared to the magnetic core 20 according to the present embodiment, the connecting portion 22 is a component that has curvature. FIG. 10D illustrates a magnetic core 20 that has a semi-elliptical cross-sectional shape. In the case illustrated in FIG. 10D, the two magnetic plates 21 and the connecting portion 22 are components that have curvature. In the magnetic core 20 illustrated in FIG. 10C and the magnetic core 20 illustrated in FIG. 10D, it is preferable that the two magnetic plates 21 and the connecting portion 22 are formed as a single structure. This enables simple production of the magnetic core 20 through bending processing of a plate made of a metal magnetic material.

Through the above, modified examples of the magnetic core 20 have been described. In the magnetic core 20 of each of the other modified examples, it is also preferable that side surface connecting portions 22b are provided at edges adjacent to a bottom surface connecting portion 22a in the same way as for the magnetic core 20 of modified example 1. As a result, a section at which the two magnetic plates 21 are connected via connecting portions 22 is increased, and thus the magnetic resistance of the magnetic core 20 can be lowered.

Modified Example in which Magnetic Core is Provided with Cover

Figure 11:
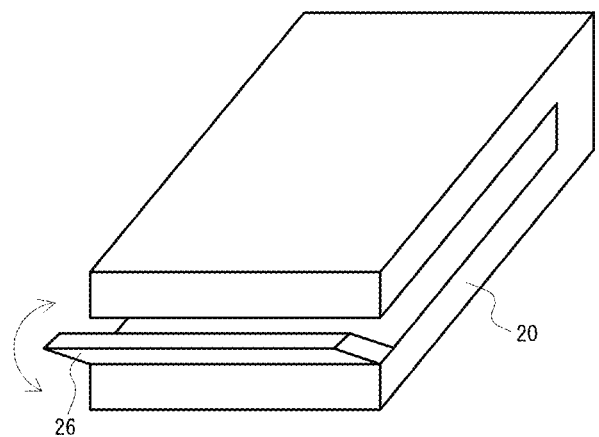
FIG. 11 illustrates an example in which a moveable cover is provided at an opening of the magnetic core according to the present embodiment.

FIG. 11 illustrates an example in which a magnetic material-containing moveable cover 26 is provided at the opening 24 of the magnetic core 20 according to the present embodiment. When the cover 26 is closed, the shape of the magnetic core 20 is the same as in modified example 2. The cover 26 is preferably made of the same material as the magnetic core 20. In the modified example illustrated in FIG. 11, the cover 26 is opened to allow insertion of the power reception antenna 3 into the space 23. The cover 26 is closed after the power reception antenna 3 is inserted. The present modified example facilitates insertion of the power reception antenna 3 into the space 23, particularly in a situation in which the power reception antenna 3 is attached partway along a component having significantly different lengths in a longitudinal direction and a transverse direction, such as a rod-shaped or belt-shaped component, and enables further lowering of magnetic resistance of the magnetic core 20 through the cover 26. As a result, it is possible to facilitate insertion of the power reception antenna 3 while also increasing the coupling coefficient k of the power transmission antenna 2 and the power reception antenna 3, and raising power transmission and reception efficiency. Note that the position of the cover 26 is not limited to the opening 24 at the opposite edge relative to the edge at the side at which the connecting portion 22 is located. The coupling coefficient k of the power transmission antenna 2 and the power reception antenna 3 is increased by closing the cover 26 even when the cover 26 is provided at a different opening 24.

Modified Example of Power Transmission Antenna

As described above, in the power transmission antenna 2, a power transmission coil 25 is attached to at least one of the two magnetic plates 21 of the magnetic core 20 at a side thereof that faces the space 23. The power transmission coil 25 preferably has a thin planar shape. The thickness of the power transmission coil 25 is preferably 1 mm or less. This contributes to size-reduction of the power transmission antenna 2. The power transmission coil 25 is preferably a spiral coil having a spiral shape. Moreover, the power transmission coil 25 is preferably a coiled single-strand wire made of Al, Cu, or an alloy having Al or Cu as a main component. Furthermore, the power transmission coil 25 may preferably be a parallel wire or braided wire in which fine wires that are finer than the single-strand wire are bunched together, or may preferably be a single-layer or double-layer a coil in which a thin rectangular wire or flat wire is used. Particularly in a situation in which the power transmission coil 25 is required to be thin, a flexible printed circuit (FPC) coil formed by patterning can be used.

Figure 12A:
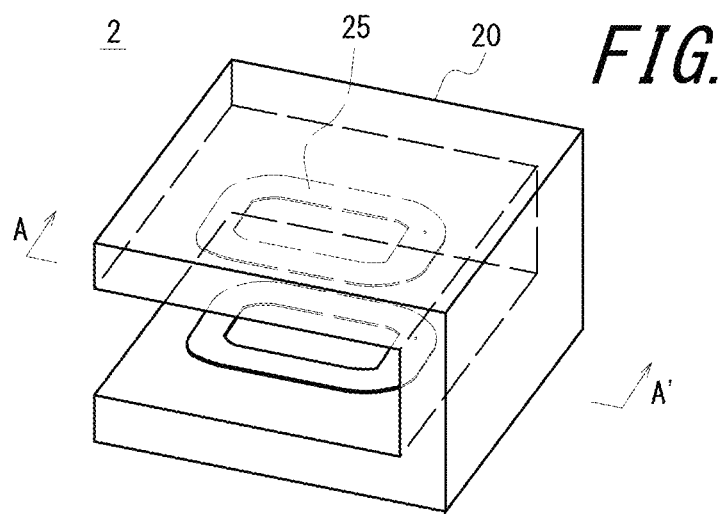
FIG. 12A is a perspective view illustrating a situation in which a power transmission coil is disposed on each of two magnetic plates.
Figure 12B:
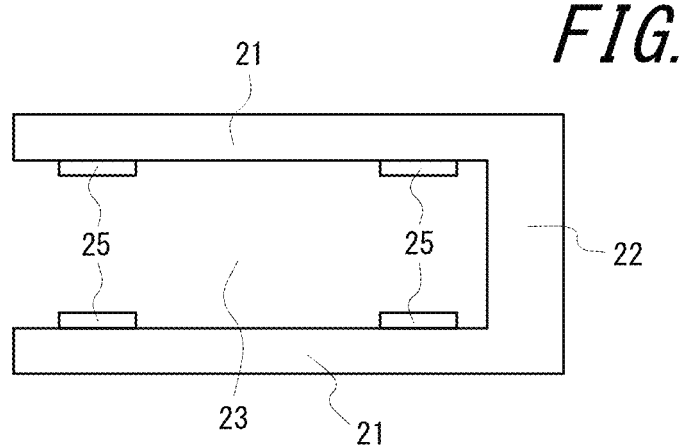
FIG. 12B is a cross-sectional view A-A' illustrating the situation in which a power transmission coil is disposed on each of the two magnetic plates.

It is preferable that a power transmission coil 25 is disposed on each of the two magnetic plates 21 of the magnetic core 20. FIGS. 12A and 12B illustrate a situation in which a power transmission coil 25 is disposed on each of the two magnetic plates 21 of the magnetic core 20. FIG. 12A is a perspective view and FIG. 12B is a cross-sectional view A-A'. By increasing the number of power transmission coils 25 to two in this manner, greater magnetic flux can be generated and magnetic flux density within the magnetic core 20 can be increased. However, it is necessary to match the phases of alternating current flowing in the two power transmission coils 25. On the other hand, when one power transmission coil 25 is included as in FIGS. 2A and 2B, the distance between the two magnetic plates 21 can be reduced by an amount equivalent to the thickness of a power transmission coil 25, and thus the overall thickness of the power transmission antenna 2 can be reduced.

Modified Example of Power Reception Antenna

As described above, the power reception antenna 3 includes the power reception coil 31 and the magnetic sheet 33. The power reception coil 31 is attached to one surface of the magnetic sheet 33. Since the shape of the power reception coil 31 is the same as the shape of the power transmission coil 25, description thereof is omitted. Examples of preferable materials for the magnetic sheet 33 include, in the same way as for the magnetic core 20, metal magnetic materials such as Fe-based metal magnetic materials, Fe—Si-based metal magnetic materials, sendust, permalloy, and amorphous metal magnetic materials; MnZn ferrite; NiZn ferrite; magnetic resin materials produced by adding a resin as a binder to magnetic particles of any of the preceding magnetic materials; and green compact materials produced by adding a small amount of a binder to magnetic particles and performing green compacting thereof. The thickness of the magnetic sheet 33 is preferably from 0.2 mm to 0.3 mm. The power reception antenna 3 preferably includes the casing 32 that houses the power reception coil 31 and the magnetic sheet 33. The casing 32 is preferably made of resin and may correspond to a band section of a power reception-side electronic apparatus 5 that is a wearable terminal.

Figure 13A:
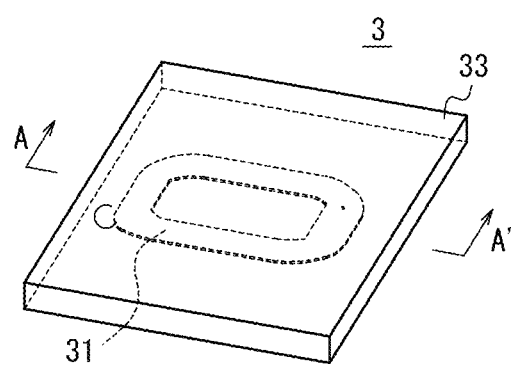
FIG. 13A is a perspective view illustrating a power reception antenna that does not include a magnetic sheet.
Figure 13B:
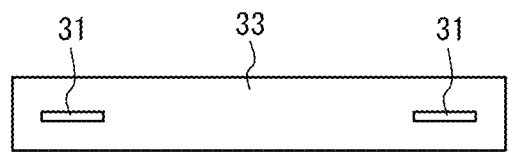
FIG. 13B is a cross-sectional view A-A' illustrating the power reception antenna that does not include a magnetic sheet.

The power reception antenna 3 is preferably composed of only non-magnetic materials without including the magnetic sheet 33. Specifically, the power reception antenna 3 can be composed of only non-magnetic materials by using a non-magnetic material such as copper wire as a conductor of the power reception coil 31 and by using a resin or the like as the casing 32. FIGS. 13A and 13B illustrate a power reception antenna 3 that does not include a magnetic sheet 33. FIG. 13A is a perspective view and FIG. 13B is a cross-sectional view A-A'. The thickness of the power reception antenna 3 that does not include a magnetic sheet 33 can be reduced compared to the power reception antenna 3 illustrated in FIGS. 4A and 4B, which does include a magnetic sheet 33.

Figure 14:
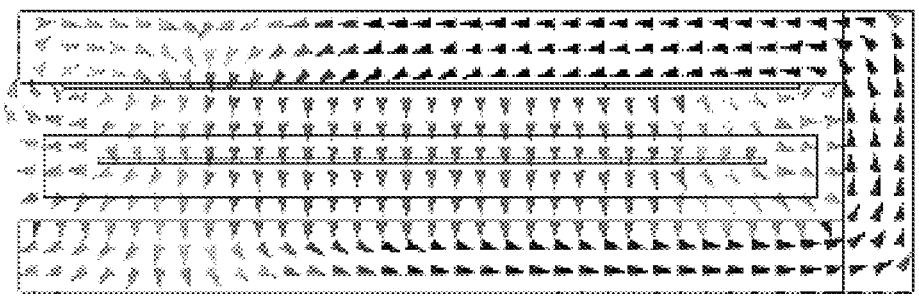
FIG. 14 is a vector representation of magnetic flux density distribution illustrating results of magnetic flux density distribution calculation for a situation in which power transmission and reception are performed by an antenna device including the power reception antenna that does not include a magnetic sheet.

An electromagnetic field simulator was used to perform three-dimensional electromagnetic field analysis for a situation in which the antenna device 1 included a power reception antenna 3 that did not include a magnetic sheet 33. Moreover, the coupling coefficient k of the antenna device 1 according to the present modified example was calculated. With the exception that a magnetic sheet 33 was not included, the calculation conditions were the same as for the situation in which the antenna device 1 included a power reception antenna 3 that did include a magnetic sheet 33. FIG. 14 is a vector representation of the calculated magnetic flux density distribution in which higher magnetic flux density is indicated by a color closer to black. The magnetic flux density distribution range and color scale are the same as in FIGS. 6A and 7A. Calculation results for the coupling coefficient k are shown below in Table 2 in addition to the results from the previously described Table 1.

TABLE 2

| | Comparative example (including magnetic sheet) | Example of present embodiment (including magnetic sheet) | Present modified example (no magnetic sheet) |
|---|---|---|---|
| Coupling coefficient k | 0.716 | 0.791 | 0.775 |

As shown, the coupling coefficient k is larger than in the comparative example even when a power reception antenna 3 that does not include a magnetic sheet 33 is included.

Examples of Incorporation of Antenna Device into Electronic Apparatus

Figure 15A:
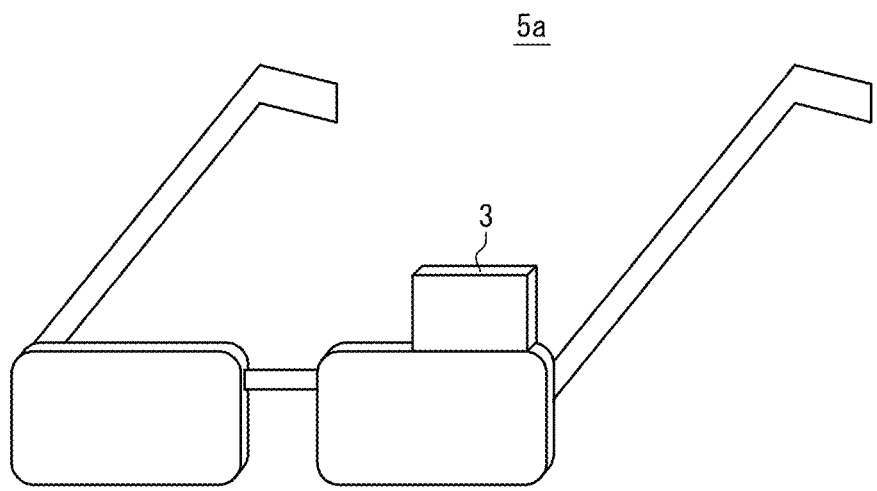
FIG. 15A is a perspective view illustrating an example in which the power reception antenna according to the present embodiment is incorporated into a glasses-type electronic apparatus and in which the power reception antenna is disposed at the top of a lens.
Figure 15B:
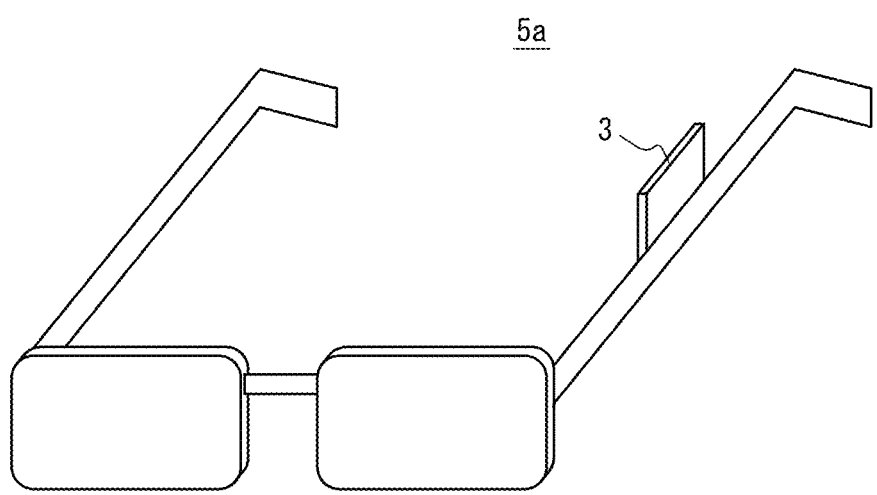
FIG. 15B is a perspective view illustrating an example in which the power reception antenna according to the present embodiment is incorporated into a glasses-type electronic apparatus and in which the power reception antenna is disposed on a temple section of the glasses.
Figure 16A:
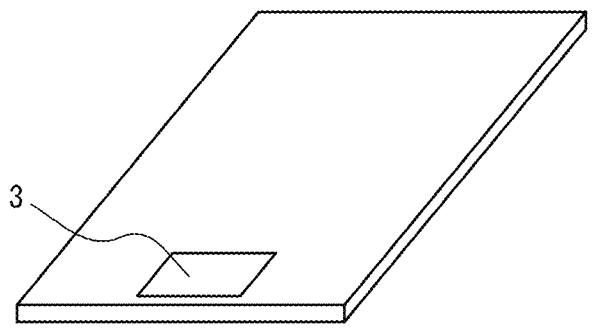
FIG. 16A is a perspective view illustrating an example in which the power reception antenna according to the present embodiment is incorporated into a card-type power reception-side electronic apparatus.
Figure 16B:
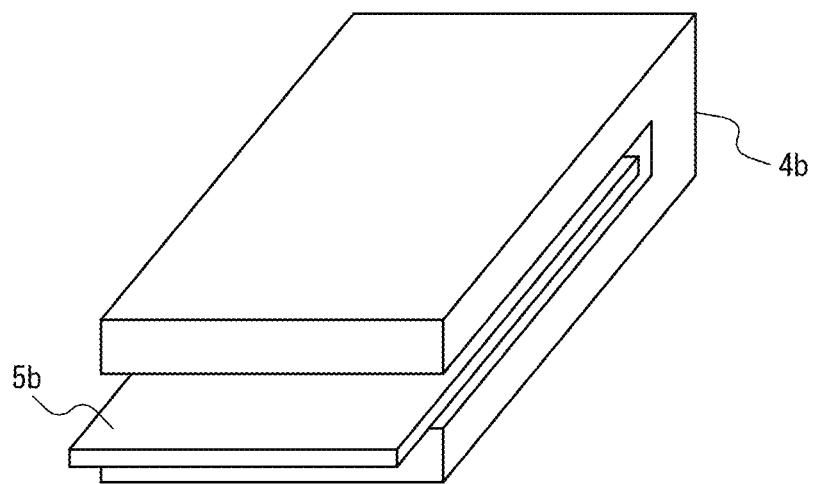
FIG. 16B is a perspective view illustrating an example in which the card-type power reception-side electronic apparatus is inserted into a power transmission-side electronic apparatus.

FIGS. 1A and 1B illustrate an example of integration of the antenna device 1 into an electronic apparatus. It is envisioned that a wristwatch-type apparatus is used as the electronic apparatus in FIGS. 1A and 1B. Other forms of electronic apparatuses may also be considered. FIGS. 15A and 15B illustrate, as the electronic apparatus, a power reception-side electronic apparatus 5a that is a glasses-type apparatus. FIG. 15A illustrates a situation in which the power reception antenna 3 is disposed at the top of a lens of the glasses-type power reception-side electronic apparatus 5a. FIG. 15B illustrates a situation in which the power reception antenna 3 is disposed on a temple section of the glasses-type power reception-side electronic apparatus 5a. FIG. 16A illustrates, as the electronic apparatus, a power reception-side electronic apparatus 5b that is a card-type apparatus. The power reception antenna 3 is disposed at an end section of the card. FIG. 16B illustrates an example in which the card-type power reception-side electronic apparatus 5b is inserted into and used in a corresponding power transmission-side electronic apparatus 4b. In the examples illustrated in FIGS. 15A, 15B, 16A, and 16B, the thinness of the power reception antenna 3 according to the present embodiment is exploited to enable inclusion of the power reception antenna 3 in the electronic apparatus. In this manner, the antenna device 1 according to the present embodiment can be incorporated into various electronic apparatuses such that these electronic apparatuses do not require terminals, cables, or the like for power supply, which enables enhancement of waterproof performance.

Modified Example Relating to Configuration for Matching Power Transmission Antenna and Power Reception Antenna Positions The power transmission and reception function of the antenna device 1 is implemented in a state in which the power reception antenna 3 is inserted into the space 23 of the power transmission antenna 2. In this state, it is preferable that the center of the power transmission coil 25 in the power transmission antenna 2 and the center of the power reception coil 31 in the power reception antenna 3 are as close as possible to increase the coupling coefficient k. In other words, if the center of the power transmission coil 25 in the power transmission antenna 2 and the center of the power reception coil 31 in the power reception antenna 3 are at shifted positions relative to each other, the coupling coefficient k is reduced and power transmission and reception efficiency is lowered. Therefore, it is preferable that the positions of the center of the power transmission coil 25 in the power transmission antenna 2 and the center of the power reception coil 31 in the power reception antenna 3 are matched as closely as possible.

Figure 17A:
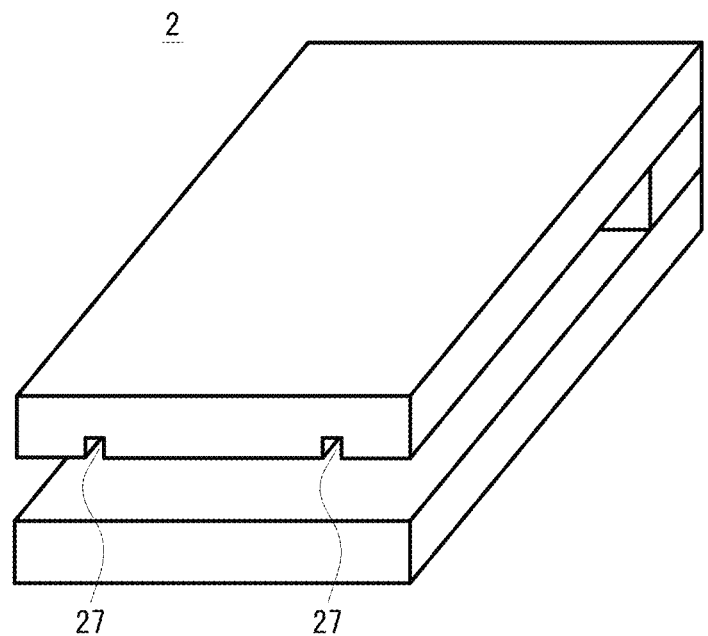
FIG. 17A illustrates a power transmission antenna in an example in which the power transmission antenna and a power reception antenna respectively include positioning portions 27 and 34.
Figure 17B:
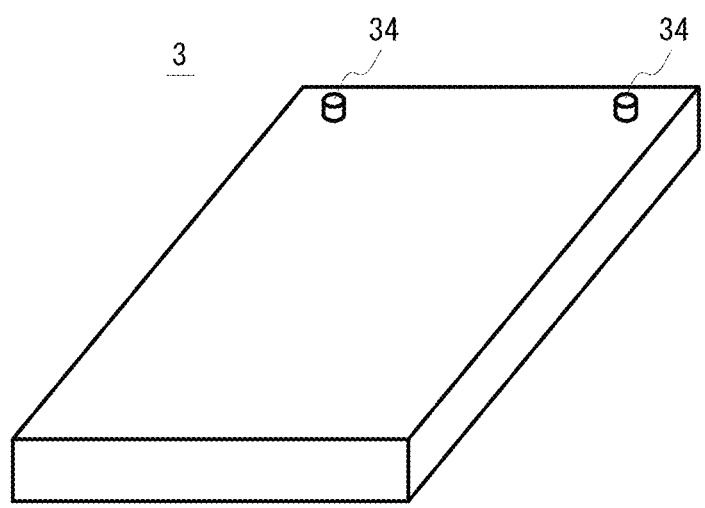
FIG. 17B illustrates the power reception antenna in the example in which the power transmission antenna and the power reception antenna respectively include positioning portions 27 and 34.

The power transmission antenna 2 and the power reception antenna 3 preferably include positioning portions 27 and 34, respectively, in order to set the center of the power transmission coil 25 in the power transmission antenna 2 and the center of the power reception coil 31 in the power reception antenna 3 at matching positions. FIGS. 17A and 17B illustrate an example in which the power transmission antenna 2 and the power reception antenna 3 respectively include positioning portions 27 and 34. FIG. 17A illustrates a situation in which the power transmission antenna 2 includes groove-shaped positioning portions 27. FIG. 17B illustrates a situation in which the power reception antenna 3 includes protrusion-shaped positioning portions 34. The positions of the power transmission coil 25 and the power reception coil 31 can be set by inserting the power reception antenna 3 into the power transmission antenna 2 such that the grooves and protrusions are fitted together. As a result, the coupling coefficient k of the power transmission antenna 2 and the power reception antenna 3 is increased, and power transmission and reception efficiency is raised. The configuration of positioning portions is not limited to this example in which the power transmission antenna 2 and the power reception antenna 3 respectively include the positioning portions 27 and 34. Alternatively, the power transmission antenna 2 or the power reception antenna 3 may include a positioning portion. It is preferable that the external shape of at least one of the power transmission antenna 2 and the power reception antenna 3 functions as a positioning portion to enable setting of positions of the center of the power transmission coil 25 in the power transmission antenna 2 and the center of the power reception coil 31 in the power reception antenna 3. For example, in a situation in which the card-type apparatus illustrated in FIGS. 16A and 16B is inserted relative to a power transmission antenna 2 including the magnetic core 20 of modified example 1, the side surface connecting portions 22b function as positioning portions. In this manner, it is possible to achieve both a simple structure and accurate positioning.

Example of Magnetic Material Selection in Consideration of Wireless Power Supply Application Recently, much activity has been focused on the widespread implementation of contactless power supply. For example, the frequency band used for wireless power transmission is being investigated in detail by the Wireless Power Transmission Working Group of the Broadband Wireless Forum. Guidelines pertaining to the use of wireless power transmission technology subjected to this investigation define frequency bands for use as 10 kHz to 10 MHz, the industrial, scientific, and medical band (ISM band: 13.56 MHz, 27.12 MHz, 40.68 MHz), and the like (note that a frequency band below 10 kHz is not subject to the Radio Act). In this manner, segregation is planned to avoid problems such as the occurrence of electromagnetic interference between communication applications and wireless power transmission (contactless power supply) applications.

Figure 18:
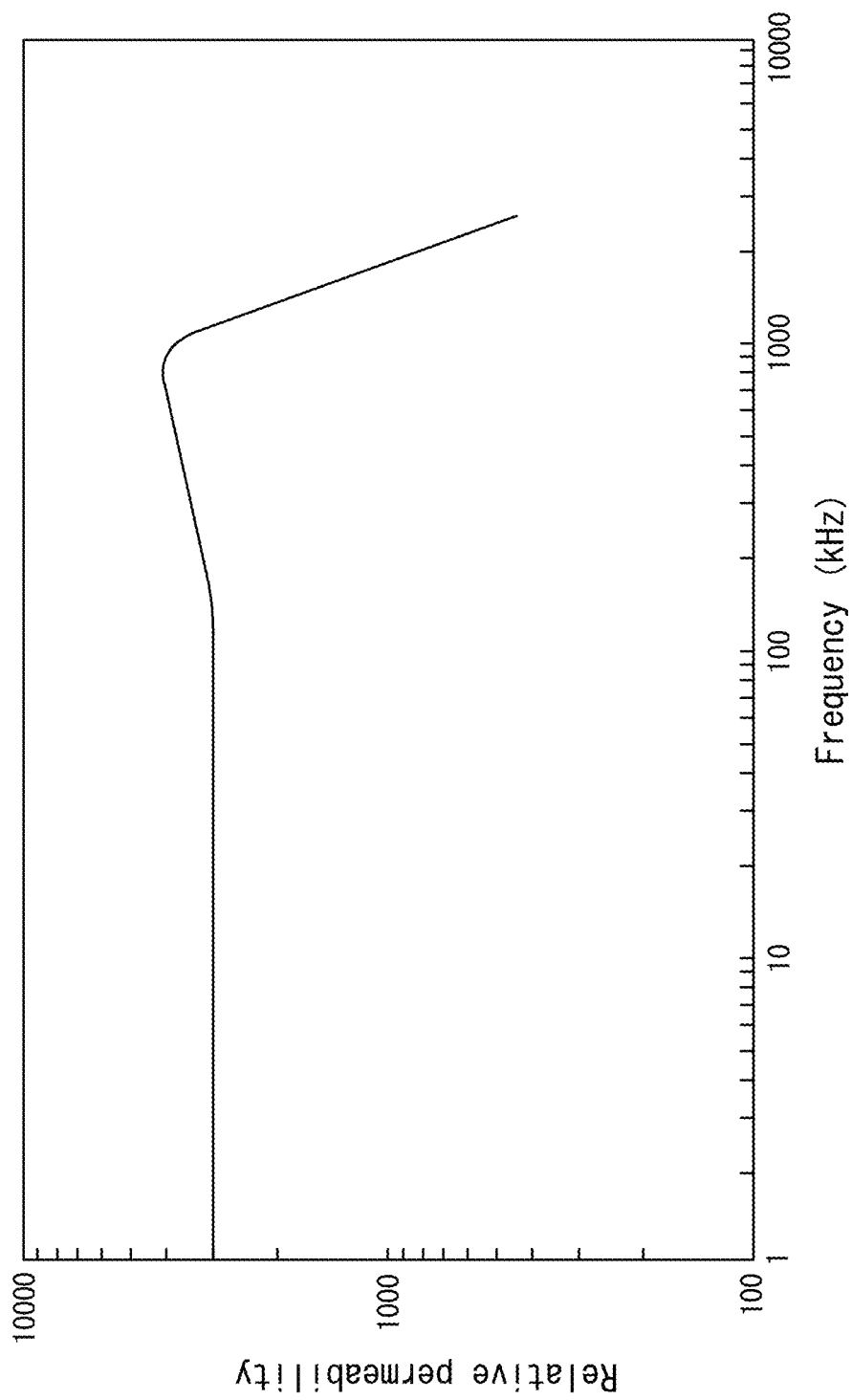
FIG. 18 illustrates an example of a frequency characteristic of relative magnetic permeability of MnZn ferrite.

In a situation in which the antenna device 1 according to the present embodiment is used for a wireless power supply application, it is envisaged that a frequency band for use such as described above is adopted as the frequency of alternating current flowing in the coils in accordance with the guidelines for wireless power transmission. The relative magnetic permeability of a magnetic material displays a frequency characteristic. For example, in the case of permalloy, the relative magnetic permeability in a 100-kHz band is approximately 5,000, whereas the relative magnetic permeability in a 1-kHz band is approximately 50,000. In other words, the relative magnetic permeability in the 100-kHz band is approximately $\frac{1}{10}^{th}$ of the relative magnetic permeability in the 1-kHz band. MnZn ferrite displays a different frequency characteristic to permalloy. FIG. 18 illustrates an example of the frequency characteristic of the relative magnetic permeability of MnZn ferrite. The relative magnetic permeability is 1,000 or higher in a region of roughly 1,000 kHz (1 MHz) or lower, but exhibits a rapid decrease once the frequency is of the order of 1 MHz. Magnetic resistance and magnetic loss are high when the value of the relative magnetic permeability is low, and thus a low relative magnetic permeability value is not suitable for application in the magnetic core 20. Accordingly, the magnetic material used to form the antenna device 1 is preferably selected in accordance with the frequency band that is used.

In a situation in which the antenna device 1 according to the present embodiment is used for a wireless power supply application, larger current flows in the power transmission coil 25 and the power reception coil 31 than in a communication application, and Joule heat is generated. The magnitude of the current may, for example, be of a 1 ampere level or a 0.1 ampere level. Moreover, the magnetic flux density generated in the antenna device 1 in a situation in which the antenna device 1 is used for a wireless power supply application is higher than in a communication application. Consequently, heat generated due to magnetic loss (core loss) such as hysteresis loss or eddy current loss when alternating current magnetic flux flows in the magnetic core 20 is also greater in use in a wireless power supply application than in a communication application. Therefore, in a situation in which the antenna device 1 is used in a wireless power supply application, the issue of how to dissipate heat generated at various locations may be problematic. A material having a relatively high thermal conductivity may be used as the magnetic core 20 to raise heat dissipation efficiency. For example, the metal magnetic material permalloy may be considered in this situation. Moreover, it is also possible to consider using a ferrite that has a high relative magnetic permeability value so long as a low-frequency region of lower than 1 MHz is adopted.

Modified Example Relating to Overall Antenna Device

The power transmission antenna 2 and the power reception antenna 3 included in the antenna device 1 according to the present embodiment are each incorporated into and used in an electronic apparatus. When the antenna device 1 according to the present embodiment is incorporated into an electronic apparatus, it is preferable that the shape of the power reception antenna 3 is altered in accordance with the shape of the electronic apparatus. Therefore, it is preferable that the power reception antenna 3 is not limited to a flat surface and can also adopt the form of a curved surface. Moreover, the power transmission antenna 2 can preferably adopt a form that is in accordance with the shape of the power reception antenna 3.

In a situation in which the electronic apparatus is a mobile terminal or a wearable terminal, the power reception antenna 3 is incorporated into a mobile terminal or wearable terminal that serves as the power reception-side electronic apparatus 5 and the power transmission antenna 2 is incorporated into a charger that serves as the power transmission-side electronic apparatus 4. The mobile terminal or wearable terminal serving as the power reception-side electronic apparatus 5 in which the power reception antenna 3 is incorporated may be charged as necessary using the charger serving as the power transmission-side electronic apparatus 4 in which the power transmission antenna 2 is incorporated. In general, there is little limitation on the size of the charger but significant limitation on the size of the mobile terminal or wearable terminal. Accordingly, there is greater limitation on the size of the power reception antenna 3 than the size of the power transmission antenna 2.

As explained above, there is a limitation on the size of the power reception antenna 3 and it is particularly beneficial to reduce the thickness of the power reception antenna 3. One issue that requires consideration in thickness-reduction is heat generation that occurs during a power transmission and reception operation as described above. In other words, it is necessary to consider, in combination, the thermal conductivity of components of the power reception antenna 3, and particularly the casing 32 which serves to dissipate heat externally, and also Joule heat in the power reception coil 31 and heat generated due to magnetic loss in the magnetic sheet 33. In particular, the thickness of the power reception coil 31 displays significant correlation with the quantity of Joule heat that is generated. When a configuration that enables sufficient heat-dissipation is adopted, the thickness of the power reception coil 31 can be reduced, and thus the overall thickness of the power reception antenna 3 can be reduced.

It should be appreciated that although a description has been provided based on the various drawings and examples, various modifications and revisions can be easily made based on the present disclosure by persons of ordinary skill in the technical field. Therefore, such modifications and revisions are also included within the scope of the present disclosure. For example, functions or the like included in each means, step, or the like may be rearranged so long as no logical contradiction arises thereby, and a plurality of means, steps, or the like may be combined into a single means, step, or the like, or may be divided up.

REFERENCE SIGNS LIST 1, 91 antenna device
2, 92 power transmission antenna
20 magnetic core
21, 921 magnetic plate
22 connecting portion
22a bottom surface connecting portion
22b side surface connecting portion
23 space
24 opening
25, 925 power transmission coil
26 cover
27 positioning portion
3, 93 power reception antenna
31, 931 power reception coil
32, 932 casing
33, 933 magnetic sheet
34 positioning portion
4, 4b power transmission-side electronic apparatus
5, 5a, 5b power reception-side electronic apparatus
6a, 6b, 96 line of magnetic flux

The invention claimed is:

1. An antenna device comprising:
a power transmission antenna including
a magnetic core including two magnetic plates that face each other, a magnetic material-containing connecting portion that connects at least part of an end section of each of the two magnetic plates, and a space between the two magnetic plates, and
a power transmission coil disposed on at least one of the two magnetic plates at a side thereof that faces the space; and
a power reception antenna including a power reception coil, wherein
the power reception antenna is positionable in the space.

2. The antenna device according to claim 1, wherein when the power reception antenna is positioned in the space, at least some lines of magnetic flux generated by current flowing in the power transmission coil form a closed loop passing through the power transmission coil, the power reception coil, the space, the two magnetic plates, and the connecting portion.

3. The antenna device according to claim 1, wherein the power reception antenna is composed of only a non-magnetic material.

4. The antenna device according to claim 1, wherein a cross-sectional shape of the magnetic core is a square U-shape, a V-shape, a Y-shape, a U-shape, or a semi-ellipse.

5. The antenna device according to claim 1, wherein the magnetic plates each have a substantially rectangular shape, and the connecting portion connects at least one edge of each of the magnetic plates.

6. The antenna device according to claim 5, wherein a distance between the two magnetic plates at an opposite edge relative to an edge at a side at which the connecting portion is located is larger than a distance between the two magnetic plates at the edge at the side at which the connecting portion is located.

7. The antenna device according to claim 5, wherein the two magnetic plates differ in terms of length from an edge at a side at which the connecting portion is located to an opposite edge relative to the edge at the side at which the connecting portion is located.

8. The antenna device according to claim 1, wherein the magnetic core includes an opening that is not connected by the connecting portion, and a magnetic material-containing movable cover is disposed in at least part of the opening.

9. The antenna device according to claim 1, wherein the magnetic core contains at least one of a metal magnetic material and a ferrite.

10. The antenna device according to claim 1, wherein the power transmission coil is disposed on each of the two magnetic plates.

11. The antenna device according to claim 1, wherein at least one of the power transmission coil and the power reception coil is a spiral coil.

12. The antenna device according to claim 1, wherein the power transmission antenna or the power reception antenna includes a positioning portion configured to set positions of the power transmission antenna and the power reception antenna.

13. The antenna device according to claim 1, wherein current flowing in the power transmission coil is alternating current having a frequency of 10 MHz or lower.

14. The antenna device according to claim 1, wherein the power reception antenna includes a magnetic sheet.

15. The antenna device according to claim 14, wherein the magnetic sheet contains at least one of a metal magnetic material and a ferrite.

16. An electronic apparatus comprising:
a power transmission-side electronic apparatus including a power transmission antenna that includes
a magnetic core including two magnetic plates that face each other, a magnetic material-containing connecting portion that connects at least part of an end section of each of the two magnetic plates, and a space between the two magnetic plates, and
a power transmission coil disposed on at least one of the two magnetic plates at a side thereof that faces the space; and
a power reception-side electronic apparatus including a power reception antenna that includes a power reception coil, wherein
the power transmission-side electronic apparatus and the power reception-side electronic apparatus are positionable in combination such that the power reception antenna is positioned in the space.

17. The electronic apparatus according to claim 16, wherein
when the power transmission-side electronic apparatus and the power reception-side electronic apparatus are positioned in combination in a manner such that the power reception antenna is positioned in the space, at least some lines of magnetic flux generated by current flowing in the power transmission coil form a closed loop passing through the power transmission coil, the power reception coil, the space, the two magnetic plates, and the connecting portion.

18. The electronic apparatus according to claim 16, wherein
the power reception-side electronic apparatus is at least one of a watch-type apparatus, a glasses-type apparatus, and a card-type apparatus.

\* \* \* \* \*